April 25, 1961 E. P. FYLER ET AL 2,981,945
ANTENNA ADAPTED FOR MISSILE STABILIZATION
Filed March 31, 1954 2 Sheets-Sheet 2
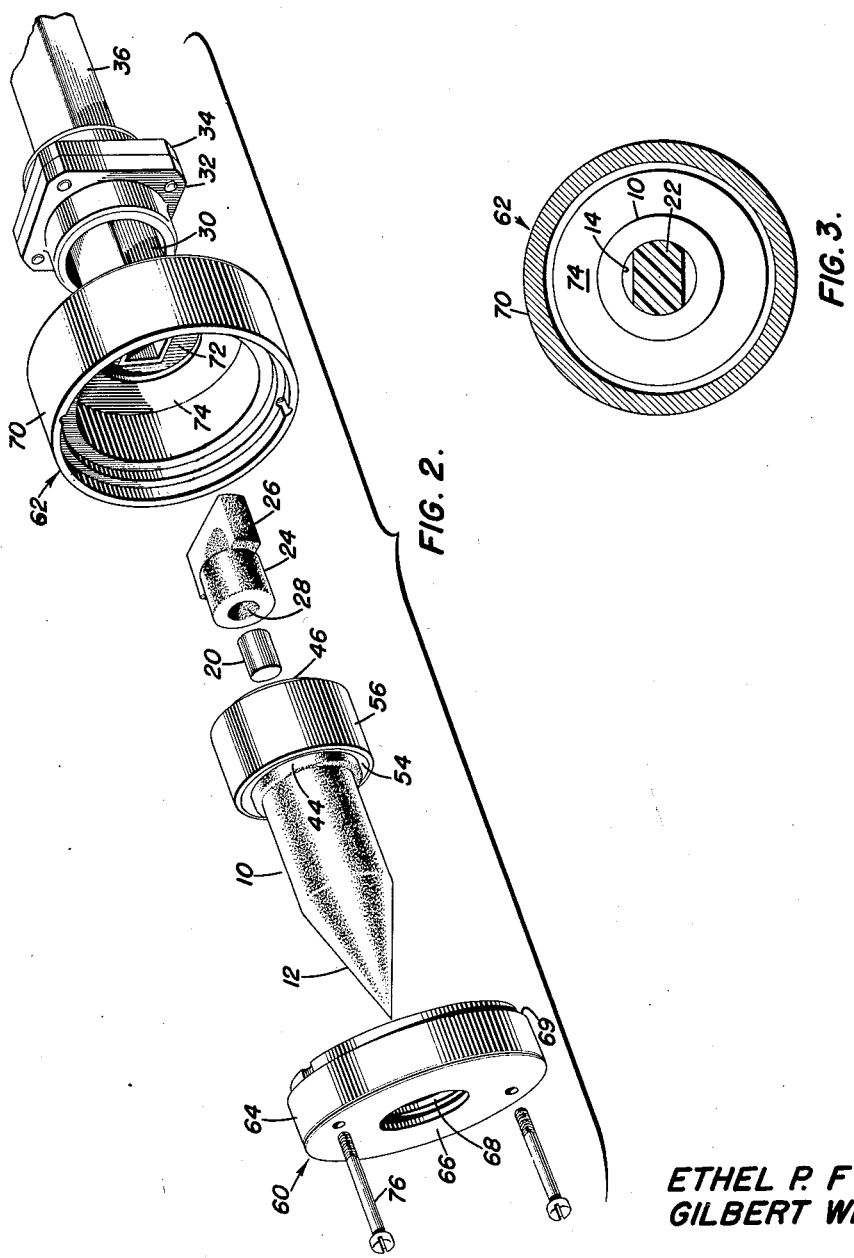
ETHEL P. FYLER
GILBERT WILKES
INVENTORS
BY G. D. O'Brien
Q. Baxter Warren
ATTORNEYS 2,981,945
Patented Apr. 25, 1961

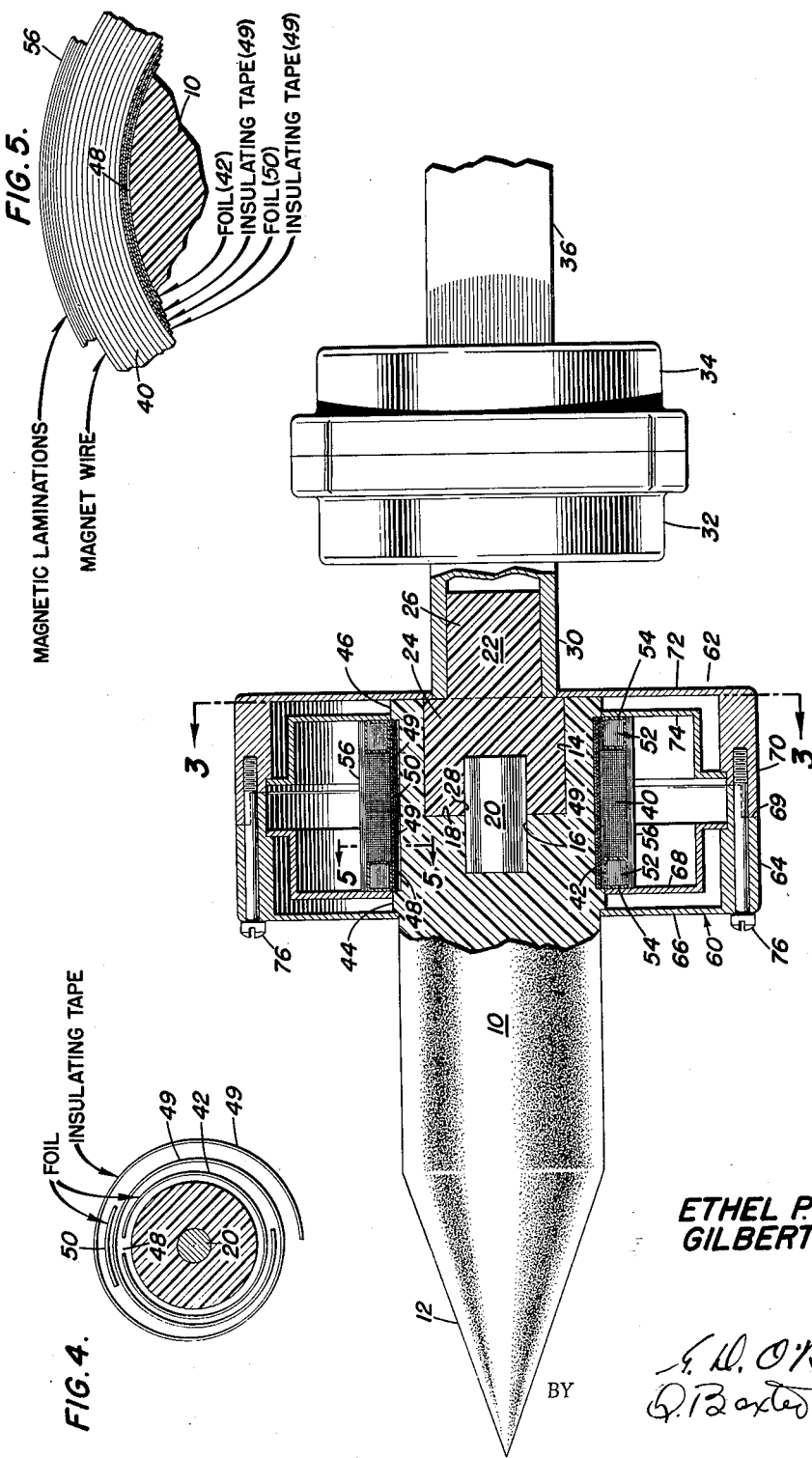

2,981,945

ANTENNA ADAPTED FOR MISSILE STABILIZATION

Ethel P. Fyler, Silver Spring, Md., and Gilbert Wilkes, Washington, D.C., assignors to the United States of America as represented by the Secretary of the Navy Filed Mar. 31, 1954, Ser. No. 420,216

7 Claims. (Cl. 343—753)

This invention relates to an improved antenna assembly for use on guided missiles. More particularly, it relates to an improved antenna system for use in combination with a roll control system of the type which roll stabilizes the guided missile on the plane of polarization of a radar guidance beam.

Usually, missile guidance systems require that the missile itself be roll stabilized. In one type of guidance system, a missile is guided to intercept a target by being constrained to ride a radar beam which is tracking a target. Thus, the plane of polarization of the electromagnetic waves of the radar beam is available at the missile as a reference plane for roll stabilization. Basically, a system which utilizes the plane of polarization as a reference plane comprises a receiving antenna assembly adapted to be mounted on a tail fin of the guided missile and including means for causing the plane of polarization of the waves arriving at the missile to oscillate at a fixed frequency. If the missile changes its roll position from the plane of polarization, the signal transmitted through the antenna assembly is modulated an amount determined by the roll. This modulation is detected and used a provide a roll control signal which will correctly roll stabilize the missile.

The antenna assembly formerly used in this roll stabilization system comprised a radio frequency lens of dielectric material having a tapered outer end and a tapered circular to rectangular transition at its inner end for feeding a rectangular wave-guide on the missile. A cylinder of material having a high Verdet constant, or power of magnetic rotation, such as a ferrite, was carried in the dielectric lens, extending along the axis of said lens. An alternating magnetic field was generated by a coil wound on the outer surface of the dielectric lens for magnetizing the cylinder. This applied magnetic field caused oscillation of the plane of polarization of the waves passing through the lens.

A close relationship between the alternating magnetic field and the rotation of the plane of polarization of the wave is necessary to make the device suitable for use in a roll stabilization system. To achieve this close relationship, it is necessary to reduce or eliminate eddy currents generated by the applied field so that good coupling with the ferrite cylinder results. Furthermore, other losses, both of the magnetic field causing rotation and of the radio frequency waves in the guidance signal passing through the lens, should be reduced or eliminated wherever possible, to maintain the signal at a usable level.

Accordingly, it is an object of the present invention to provide an improved missile antenna assembly for use with a roll stabilizaiton system of the type in which the plane of polarization of received waves is used as a reference plane.

Another object of the invention is the provision of a missile antenna assembly of the type in which the plane of polarization of the received waves is caused to oscillate by being passed through a medium including a cylinder of material of high Verdet constant, to which an alternating magnetic field is applied.

A more specific object is the provision of an antenna assembly of this type wherein the desired relationship between the oscillations of the received waves and the applied magnetic field can be achieved and maintained.

A further specific object is the provision of an antenna assembly of this type wherein the eddy current losses are reduced and a lossless unrestricted path is provided for the received waves.

Further objects and many of the attendant advantages of the present invention will become evident from the following detailed description taken in conjunction with the accompanying drawings, in which:

Fig. 1 is an elevation of the antenna assembly of the present invention, some parts being shown in section;

Fig. 2 is an exploded view of the antenna assembly;

Fig. 3 is a reduced section on line 3—3 of Fig. 1;

Fig. 4 is a reduced diagrammatic view showing the details of the manner in which losses due to wave leakage are prevented; and Fig. 5 is an enlarged partial section on line 5—5 of Fig. 1.

Briefly, the invention comprises a circular radio frequency lens of dielectric material which is tapered at one end. A selected cylinder of ferrite having a high power of magnetic rotation of the plane of polarization of the received waves and high resistivity is inserted in the lens, extending along the longitudinal axis thereof. The other end of the dielectric lens is provided with a tongue adapted to be received in a rectangular wave-guide to achieve the transition from the circular dielectric lens to the rectangular waveguide. A slotted sleeve having a longitudinal choke is fitted around the periphery of the lens in the vicinity of the ferrite cylinder to prevent leakage of the received waves, and shoulders are provided in the dielectric to retain the sleeve in position. A coil is wound over the sleeve and the pole pieces and laminations associated with the coil are arranged to provide a magnetic circuit that will achieve efficient magnetization of the ferrite cylinder. The slotted sleeve is insulated from the other metallic parts of the assembly, and chokes are provided to prevent the shoulders on the dielectric from appearing as discontinuities to the received waves.

Referring to Figs. 1 and 2 of the drawing, the antenna assembly is illustrated as comprising a circular radio frequency lens 10 of dielectric material such as Teflon. The lens 10 is provided with a tapered outer end 12 to provide the desired antenna pattern. The whole assembly shown in Figs. 1 and 2 is mounted on an aerial vehicle (not shown) and is normally oriented so that the tapered end 12 points in the general direction of a source of radio frequency waves. The inner end of the lens 10 is provided with an axially extending cylindrical recess 14 which terminates in a second cylindrical recess 16, of smaller diameter, thereby forming a shoulder 18. The reduced recess 16 also extends axially of the lens 10 and receives one-half of a cylinder 20 of a ferromagnetic material generally known as a "ferrite." A circular to rectangular transition element 22 is received in the recess 14 and includes a cylindrical portion 24 and a rectangular tongue 26. The cylindrical portion 24 of the transition element 22 has a recess 28 to receive the other half of the ferrite cylinder 20, and the tongue 26 extends into the open end of a section of rectangular waveguide 30. The rectangular waveguide section 30 carries a flange 32 for coupling to a flange 34 carried by a rectangular waveguide 36 which feeds a receiver (not shown) on the aerial vehicle.

When under the influence of an applied magnetic field developed by an oscillatory current supplied to a coil 40 by any suitable source, the ferrite cylinder 20 has the property of rotating the plane of polarization of the waves being propagated through the dielectric lens 10. This phenomenon resembles the Faraday rotation in optics. It is a well known phenomenon that is explained in terms of gyromagnetic resonance occurring in ferrites at microwave frequencies. No attempt is made here to expound the theories involved, which are set forth in detail in an article in the Bell System Technical Journal, vol. 31, No. 1, January 1952, entitled "The Ferromagnetic Faraday Effect at Microwave Frequencies and its Applications," by C. L. Hogan.

For efficiently magnetizing the ferrite cylinder 20, the coil 40 surrounds the dielectric lens 10 in the vicinity of said cylinder. To prevent leakage of the waves, the dielectric is provided with a sleeve 42 constituted by a foil wrapping which is retained between shoulders 44 and 46 on the dielectric 10. As can be seen in the exaggerated view of Fig. 4, the sleeve 42 is slotted at 48 so that it does not appear as a short-circuited conductor in the alternating magnetic field generated by the coil 40. At least one layer of insulating tape 49 is wound over the sleeve 42 and a longitudinal choke 50, also formed of foil, is positioned over the slot 48 to prevent the dielectric lens 10 from appearing discontinuous to the incoming waves. The coil 40 consists of several thousands of turns of magnet wire wound over the outermost layer of the tape 49. A laminated pole piece 52 is provided adjacent each end of the coil 40. Each pole piece is carefully wrapped with a layer of tape 54 to provide electrical insulation. Layers 56 of magnetic material, such as Mu-metal or Permalloy, are wrapped over the coil 40 to provide a magnetic shell surrounding said coil.

To facilitate the assembly of the magnetizing coil and to provide microwave chokes for obscuring any discontinuity appearing in the vicinity of the shoulders 44 and 46, a cylindrical housing comprising mating outer and inner members 60 and 62 is provided. The outer housing member 60 includes an outer cylindrical wall 64 and end walls 66 and 68 shaped to provided a folded half-wave choke which may be filled with Teflon, if desired. A shoulder 69 is formed on cylindrical wall 64 against which the outer cylindrical wall 70 of member 62 abuts. The member 62 is also provided with end walls 72 and 74 to provide a half-wave choke. The two housing members 60 and 62 are fastened together by screws 76.

In operation, an alternating current of the desired frequency is supplied to the coil 40 thereby providing an alternating magnetic field for magnetizing the ferrite cylinder 20. As the received microwave signals pass through the dielectric lens 10 and the ferrite cylinder 20, the plane of polarization will be oscillated by the application of the field to and resultant magnetization of the ferrite cylinder.

The transmission through the entire antenna assembly takes place with practically no losses. The arrangement of the longitudinally slotted foil sleeve 42, the foil choke 50, and the folded chokes formed at the ends of the sleeve provide a symmetrical path for the received waves. Care is taken to select a ferrite 20 with a high resistivity characteristic. At the same time, efficient magnetization of the ferrite 20 is achieved by the arrangement of the coil 40 and the pole piece 52, and the slotting of sleeve 42 to prevent eddy currents therein. The conversion of the plane polarized radar waves to a circular guide mode is accomplished by the lens 10 and reflection free conversion from the circular mode to the rectangular mode, required in the rectangular waveguide 30, is achieved by the transition 22. The waves are then transmitted through the waveguide sections 30 and 36 to the missile receiver (not shown).

Obviously many modifications and variations of the present invention are possible in the light of the above teachings. It is therefore to be understood that within the scope of the appended claims the invention may be practiced otherwise than as specifically described.

What is claimed is:

1. In an antenna system, a lens of dielectric material for receiving electromagnetic waves, a wrapping of foil arranged on said lens and having a longitudinal slot therein, an insulating wrapping overlying said wrapping of foil, a strip of foil overlying said insulating wrapping and positioned over said slot, and a choke provided at each end of said foil wrapping in contact with said lens.

2. In an antenna system, a circular lens of dielectric material, a rectangular waveguide connected to the lens, and means for converting plane polarized waves being transmitted through said lens into plane polarized waves for entry into the rectangular waveguide, said means being constituted by a transition element having a cylindrical dielectric portion received in the lens, and a rectangular tongue of dielectric extending into the rectangular waveguide.

3. An antenna assembly for receiving radio frequency guidance signals, comprising a circular lens of dielectric material, a transition element connected with the lens for converting plane polarized waves in the lens into plane polarized waves in a mode suited to a rectangular waveguide, a cylinder of ferromagnetic material arranged along the axis of said lens, a metallic sleeve having a longitudinal slot therein surrounding said lens in the vicinity of said cylinder of ferromagnetic material, a coil wound over said cylinder and energizable for providing an alternating current magnetization for said cylinder of ferromagnetic material, whereby useful modulation of the plane of polarization of the incoming wave may be obtained, and a rectangular waveguide for receiving said converted waves.

4. An antenna assembly for receiving radio frequency guidance signals, comprising a circular lens of dielectric material, a cylinder of ferromagnetic material arranged along the axis of said lens, a metallic sleeve having a longitudinal slot therein surrounding said lens in the vicinity of said cylinder, a strip of conducting material positioned over said slot, said strip of conducting material being insulated from said sleeve, and a coil wound over said sleeve and energizable by an alternating current source for magnetizing said cylinder, whereby useful modulation of the plane of polarization of an incoming signal may be obtained.

5. An antenna assembly for receiving radio frequency guidance signals, comprising a circular lens of dielectric material, a cylinder of ferromagnetic material arranged along the axis of said lens, a metallic sleeve having a longitudinal slot therein surrounding said lens in the vicinity of said cylinder of ferromagnetic material, a strip of conducting material positioned over said slot and being insulated from said sleeve, a coil wound on said sleeve, said coil being insulated from said sleeve and said strip of conducting material and being energized by alternating current for providing a modulation source, and a low eddy-loss magnetic pole piece adjacent each end of said coil, said pole pieces being insulated from said coil, strip and sleeve, energization of said coil providing modulation of the plane of polarization of incoming guidance signals.

6. An antenna assembly as claimed in claim 5, including a housing for enclosing said sleeve, coil, and pole pieces, said housing being arranged to provide half-wave chokes in contact with the outside surface of said lens at each end of said sleeve, whereby the assembly is matched to an incoming signal regardless of metallic discontinuities in the lens necessitated by the use of the alternating current modulating source.

7. In an antenna system, a lens of dielectric material for receiving electromagnetic waves, and means about the lens constraining said waves to pass through the lens, but subject to modulation of their plane of polarization, said means comprising a wrapping of foil arranged on said lens and having a longitudinal slot therein, an insulating wrapping overlying said wrapping of foil, and a strip of foil overlying said insulating wrapping and positioned over said slot.

References Cited in the file of this patent

UNITED STATES PATENTS

| | | |
|---|---|---|
| 2,106,770 | Southworth | Feb. 1, 1938 |
| 2,238,770 | Blumlein | Apr. 15, 1941 |
| 2,460,401 | Southworth | Feb. 1, 1949 |
| 2,644,930 | Luhrs et al. | July 7, 1953 |
| 2,677,055 | Allen | Apr. 27, 1954 |